United States Patent
Fisher

(10) Patent No.: US 10,049,451 B2
(45) Date of Patent: Aug. 14, 2018

(54) AUTOMATED LESION SEGMENTATION FROM MRI IMAGES

(71) Applicant: THE CLEVELAND CLINIC FOUNDATION, Cleveland, OH (US)

(72) Inventor: Elizabeth Fisher, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 0 days.

(21) Appl. No.: 15/367,349

(22) Filed: Dec. 2, 2016

(65) Prior Publication Data

US 2017/0161894 A1    Jun. 8, 2017

Related U.S. Application Data

(60) Provisional application No. 62/262,057, filed on Dec. 2, 2015.

(51) Int. Cl.
*G06T 7/00* (2017.01)
*G06T 7/11* (2017.01)
*G06K 9/62* (2006.01)

(52) U.S. Cl.
CPC .......... *G06T 7/0012* (2013.01); *G06K 9/6293* (2013.01); *G06T 7/11* (2017.01); *G06T 7/0081* (2013.01); *G06T 2207/10088* (2013.01); *G06T 2207/20076* (2013.01); *G06T 2207/20081* (2013.01); *G06T 2207/20128* (2013.01); *G06T 2207/20221* (2013.01); *G06T 2207/30016* (2013.01); *G06T 2207/30096* (2013.01)

(58) Field of Classification Search
CPC ... G06T 11/008; G06T 7/0012; G06K 9/6278; G06K 9/6281; A61B 5/7275
See application file for complete search history.

(56) References Cited

U.S. PATENT DOCUMENTS

| 6,366,797 B1 * | 4/2002 | Fisher | A61B 5/055 |
| | | | 128/922 |
| 7,756,306 B2 * | 7/2010 | Nowinski | G06K 9/3233 |
| | | | 382/128 |
| 2003/0139886 A1 * | 7/2003 | Bodzin | G01N 21/47 |
| | | | 702/28 |

(Continued)

OTHER PUBLICATIONS

Cabezas, M. et al., "BOOST: A supervised approach for multiple sclerosis lesion segrnention," Journal of Neuroscience Methods, 237 (1)(2014), pp. 108-117.

(Continued)

*Primary Examiner* — Bobbak Safaipour
(74) *Attorney, Agent, or Firm* — Tarolli, Sundheim, Covell & Tummino LLP

(57) ABSTRACT

Systems and methods are provided for automated segmentation of lesions within a region of interest of a patient. At least one magnetic resonance imaging (MRI) image of the region of interest is produced. At least one probability map is generated from the at least one MRI image. A given probability map represents, for each of a plurality of pixels, a likelihood that a lesion is present at the location represented by the pixel given the at least one MRI image of the region of interest. The at least one probability map is combined with a plurality of additional probability maps to provide a composite probability map. Lesions are identified from the composite probability map.

16 Claims, 2 Drawing Sheets

(56) References Cited

U.S. PATENT DOCUMENTS

| | | | |
|---|---|---|---|
| 2003/0236457 A1* | 12/2003 | Mericle | A61K 49/0002 |
| | | | 600/420 |
| 2012/0189176 A1* | 7/2012 | Giger | G06K 9/6253 |
| | | | 382/128 |
| 2015/0045651 A1* | 2/2015 | Crainiceanu | A61B 5/055 |
| | | | 600/410 |
| 2016/0350933 A1* | 12/2016 | Schieke | G06T 11/008 |
| 2016/0350946 A1* | 12/2016 | Schieke | G06T 11/008 |
| 2017/0287175 A1* | 10/2017 | Lin | G06T 11/008 |
| 2017/0300741 A1* | 10/2017 | Seuss | G06K 9/00268 |

OTHER PUBLICATIONS

Erbayat Altay, E., et al., "Reliability of classifying multiple sclerosis disease activity using MRI in a clinic setting." Archives of Neurology JAMA Nuero, Mar. 1, 2013; 70(3): 338-344.

Guo, D. et al., "Automated lesion detection on MRI scans using combined unsupervised and supervised methods," BMC Medical Imaging (2015), pp. 1-21.

Llado, X. et al "Segmentation of multiple sclerosis lesions in brain MRI: A review of automated approaches," Information Sciences, 186 (1)(2011), pp. 164-185.

Vaidya, S. et al., "Longitudinal Multiple Sclerosis Lesion Segmentation Using 3D Convolutional Neural Networks," Biomedical Imaging Lab, Dept. of Engineering Design, Indian Institute of Technology Madras, India.

International Search Report to corresponding US Appl. No. PCT/US2016/064555, dated May 4, 2017, pp. 1-15.

* cited by examiner

AUTOMATED LESION SEGMENTATION FROM MRI IMAGES

RELATED APPLICATIONS

This application claims priority from U.S. Patent Application Ser. No. 62/262,057, filed 2 Dec. 2015, which is incorporated herein in its entirety.

TECHNICAL FIELD

This invention relates to medical imaging, and more particularly, to automated segmentation of lesions within magnetic resonance images.

BACKGROUND

Magnetic resonance imaging (MRI) is a medical imaging technique used in radiology to investigate the anatomy and physiology of the body. MRI scanners use magnetic fields and radio waves to form images of the body. The technique is widely used in hospitals for medical diagnosis, staging of disease, and follow-up to avoid exposing the patient to ionizing radiation. To perform a study, the patient is positioned within an MRI scanner which forms a strong magnetic field around the area to be imaged. In most medical applications, protons in tissues containing water molecules are used to create a signal that is processed to form an image of the body. First, energy from an oscillating magnetic field is temporarily applied to the patient at the appropriate resonance frequency. The excited hydrogen atoms emit a radio frequency signal which is measured by a receiving coil. The radio signal can be made to encode position information by varying the main magnetic field using gradient coils. The contrast between different tissues is determined by the rate at which excited atoms return to the equilibrium state. Exogenous contrast agents may be given intravenously, orally or intra-articularly.

SUMMARY OF THE INVENTION

In accordance with an aspect of the present invention, a method is provided for automated segmentation of lesions within a region of interest of a patient. At least one magnetic resonance imaging (MRI) image of the region of interest is produced. At least one probability map is generated from the at least one MRI image. A given probability map represents, for each pixel, a likelihood that a lesion is present at the location represented by the pixel given the at least one MRI image of the region of interest. The at least one probability map is combined with a plurality of additional probability maps to provide a composite probability map. Lesions are identified from the composite probability map.

In accordance with another aspect of the present invention, a system is provided for automated segmentation of lesions within a region of interest of a patient. A magnetic resonance imaging (MRI) interface receives at least one MRI image of the region of interest. A probability map generator generates at least one probability map. A given probability map represents, for each pixel, a likelihood that a lesion is present at the location represented by the pixel given the at least one MRI image of the region of interest. A probability reconciliation component combines the at least one probability map with an additional probability map to provide a composite probability map. The additional probability map represents, for each pixel, a likelihood that a lesion is present given previous data sets from a population of patients, including patients other than the patient.

In accordance with yet another aspect of the present invention, a system is provided for automated segmentation of lesions within a region of interest of a patient. A magnetic resonance imaging (MRI) interface receives at least one MRI image of the region of interest. A probability map generator generates at least one probability map. A given probability map represents, for each pixel, a likelihood that a lesion is present at the location represented by the pixel given the at least one MRI image of the region of interest. A probability reconciliation component combines the at least one probability map with a generic lesion probability map combining lesion maps across a large population of patients to represent the regions in the brain for which it is most likely that lesions will form and a false positive probability map combining maps of false positive results across the population of patients representing regions having a high likelihood of being false positives across patients to provide a composite probability map.

DETAILED DESCRIPTION

Currently, magnetic resonance imaging (MRI) is part of standard care for multiple sclerosis (MS) patients and subjective assessment of MS lesion load is done routinely in the clinic. Even where a degree of automation is used, current approaches often lead to sub-optimal results and a second step is needed where a trained operator must visually inspect the results and manually remove false positives and add in false negatives. Manual correction of lesion segmentation is time-consuming and subjective, and can lead to a bottleneck in image analysis pipelines for large datasets and increased variability in the results.

The systems and methods provided herein provide quantitative measurements to augment a technician's visual assessment. Specifically, the described systems and methods utilize multiple probability maps for lesion segmentation, alleviating the need for manual corrections and allowing for truly automated lesion segmentation. The numerical results for T2 lesion volume produced by the systems described herein are less subjective and variable than those generated by current manual and semi-automated techniques, improving patient outcomes and measurements in clinical trials by adding more reliable measurements for a neurologist to use in decision making. These systems and methods would allow for an objective assessment rather than a subjective assessment of T2 lesion volumes so that results could be pulled and analyzed across healthcare providers and centers and potentially used to generate treatment algorithms to improve outcomes.

Figure 1:
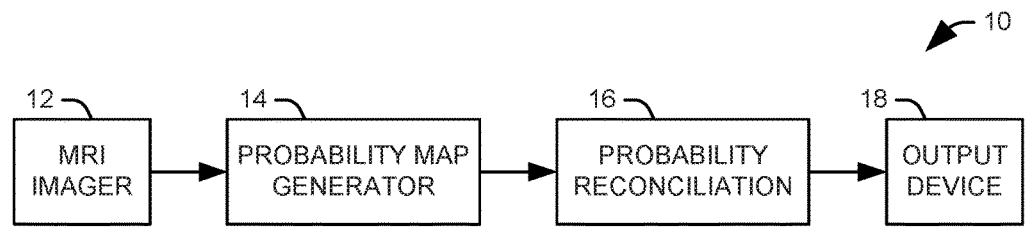
FIG. 1 illustrates one example of system for automatic segmentation of lesions within MRI images.

FIG. 1 illustrates one example of system 10 for automatic segmentation of lesions within MRI images. The system includes an MRI imager 12 configured to provide at least one MRI image of a location of interest of a patient. It will be appreciated that any suitable image can be used for this purpose. In one implementation, the at least one MRI image includes either or both of a T2-weighted fluid-attenuated inversion recovery image and a T2-weighted dual echo image.

The at least one MRI image is provided to a probability map generation component 14. The map generation component 14 generates a plurality of lesion probability maps, each comprising a plurality of pixels representing a portion of the location of interest, with a value of each pixel representing a likelihood that a lesion is present at the location represented by the pixel. In the illustrated implementation, the plurality of lesion probability maps include a registered cumulative lesion probability map from the patient's previously analyzed MRIs and a generic lesion false probability map, for example, based on an appropriate anatomical atlas, that is deformed to match the at least one MRI.

The plurality of lesion probability maps are provided to a probability reconciliation component 16 configured to combine the lesion probability maps to provide a composite probability map. In one implementation, the composite probability map can be formed such that each pixel of the composite probability map is a weighted linear combination of the corresponding pixels from the plurality of lesion probability maps. An optimal set of weights can be determined and used for all of the pixels within the composite probability map, or the weights used to combine the lesion probability maps can vary spatially across the location of interest.

The determined composite probability map can then be provided to an output device 18. In one example, the output device 18 can be a display, with the pixel values of the composite probability map represented as displayed chromaticity values on the display. For example, any of the brightness, hue, or saturation of the pixel can be selected to represent the pixel value. From the composite probability map, an physician or other user can utilize the composite probability map to guide a review of the patient's MRI images or accept any high probability regions as lesions.

Figure 2:
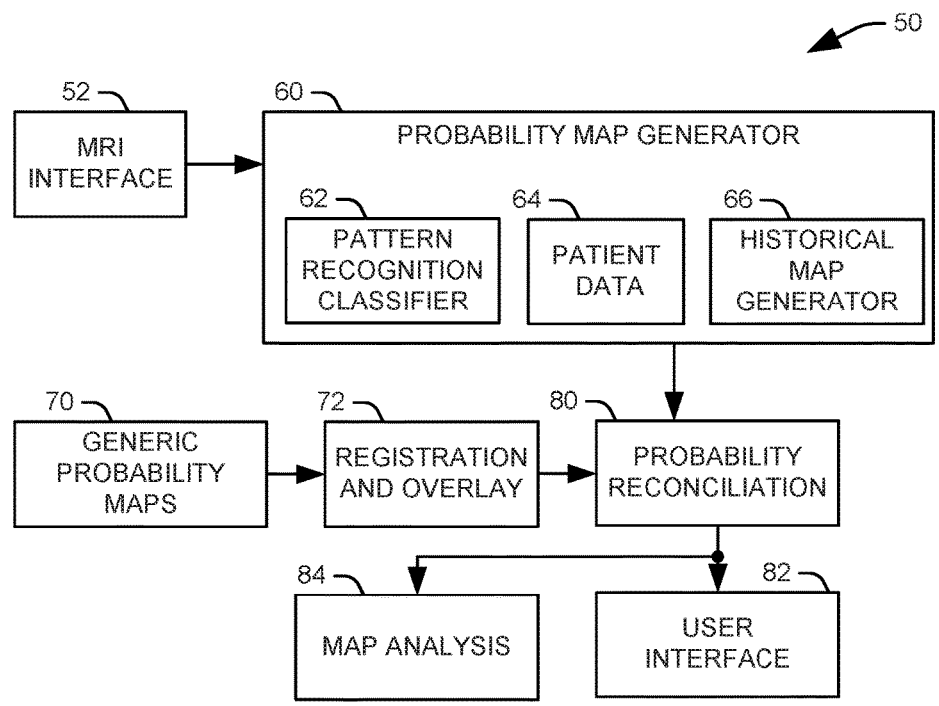
FIG. 2 illustrates one example of a system for automatic segmentation of multiple sclerosis (MS) lesions within MRI images.

FIG. 2 illustrates an example of a system 50 for automatic segmentation of multiple sclerosis (MS) lesions within MRI images. MRI has become a critical tool in the care of MS patients. MS neurologists utilize lesions on T2-weighted MRIs for diagnosis, prognosis, and treatment monitoring. T2 lesions are also one of the key outcome measures in clinical trials of potential new MS therapies. There have been many research studies demonstrating the usefulness and importance of T2 lesions as a marker of MS disease activity and progression. However, MRI assessments in the clinic are almost always based on visual inspection because quantitative measurements are not widely available and the tools that do exist require manual corrections. The illustrated system benefits patients' health outcomes by providing a tool to MS neurologists to obtain quantitative T2 lesion measurements in a time-efficient way that's feasible in a clinical setting.

It will be appreciated that the system 50 can be implemented as dedicated hardware, software instructions executed by an associated processor, or a combination of dedicated hardware and software instructions. In the illustrated implementation, the system 50 is implemented as a shell-script that runs on LINUX workstations. The shell script calls a sequence of programs written in C and compiled for LINUX. The system 50 includes an MRI interface 52 that receive one or both of T2-weighted FLAIR or PD-/T2-weighted dual echo images as input and format them for analysis by the system.

The images are provided to a probability map generator 60 configured to provide a plurality of probability maps of a region of interest, each representing a spatial distribution of the likelihood that a lesion is present in the region of interest. The probability map generator 60 includes a pattern recognition classifier 62 configured to produce a binary map representing a classification of each pixel. In other words, each pixel of the binary map has a value of one or zero, representing a classification result between a first class representing the presence of a lesion and a second class representing an absence of a lesion. In one example, the pattern recognition classifier can utilize an iterated conditional modes (ICM) classification algorithm employing at least the intensity values from the T2-weighted FLAIR image or images as classification features. The probability map generator can also produce a map representing the classification results as continuous values. For example, each pixel can be represented as a confidence value or generated probability from the pattern recognition classifier.

The probability map generator 60 can also combines information from patient data 64, including previously obtained and analyzed MRIs, to provide a longitudinal map. The historical probability map generator 66 leverages longitudinally acquired data, based on the knowledge that the vast majority of MS lesions on T2-weighted MRIs persist over time and do not disappear from scan to scan. Each of the patient's scans can be registered to a common reference to provide for a pixel-by-pixel comparison. In one implementation, each pixel of the longitudinal map represents a cumulative lesion probability map formed as a linear combination of the previously determined probabilities for that pixel in the registered images. Alternatively, each pixel can represent a maximum probability recorded for that pixel across the registered images or a selected subset of the images (e.g., comprising the most recent images).

The system 50 can also utilize generic probability maps 70 that are not specific to the patient. In the illustrated implementation, these maps include a generic MS lesion probability map, a generic MS lesion false positive probability, and a generic anatomic probability map of gray matter. Each of these maps can be deformed to fit the patient's MRI at a registration and overlay component 72. The generic MS lesion probability map leverages data from previous large-scale studies to indicate the regions in the brain for which it is most likely that lesions will form. In the illustrated implementation, the map is formed from a plurality of expert-corrected final lesion masks were registered to a standard space and combined to form a generic lesion probability map represents the likelihoods of MS lesions in all areas of the brain.

The generic MS lesion false positive probability map is also formed from a large number of previous datasets. In each dataset, an expert-corrected final lesion mask was subtracted from an automatically-generated initial lesion mask, for example, like the binary classification probability map described previously, to create an image of false positive lesions. The false positive lesion maps for each individual were then registered to standard space and combined across datasets, so that the final false positive probability map provides algorithm-specific information on regions with high likelihood of being false positives across subjects. Effectively, this indicates the most common places in the brain where the classification algorithm makes mistakes.

Each of the generic probability maps 70 and the probability maps generated at probability map generator 60 are provided to a probability reconciliation component 80 configured to combine the lesion probability maps to provide a composite probability map. In the illustrated implementation, the probability maps are combined to form a composite probability map in which each pixel of the composite map is a weighted linear combination of the corresponding pixels from the constituent images. In the illustrated implementation, a global set of weights can be used across the entire composite image. An optimal set of weights for combining the probability maps can be determined by systematically testing different values within pre-specified ranges and comparing the lesion mask results to manually corrected segmentation to find the combination of weights that results in the highest similarity index. Alternatively, an optimal set of weights can also be determined using an expert system, such as a feed-forward neural network, trained on prior datasets with expert segmentation available.

In alternate implementation, the weights can vary spatially across the image, with the weights in each of a plurality of regions determined via a regression analysis using a manually corrected segmentation. Further, the weights can be configurable by a user via an appropriate user interface 82. Regardless, it will be appreciated that the gray matter anatomic probability map and the false positive lesion map will generally have a negative-valued weight or be configured relative to the other maps to be mathematically equivalent to negatively weighted to effectively minimize false positive lesions from the final segmentation.

A map analysis component 84 can review the composite probability map to indicate the location of lesions. This can be done via a simple thresholding process, in which pixels having a probability greater than a threshold value indicated as part of a lesion. In other implementations, connected groups of high-probability pixels can be selected as lesions, with groups smaller than predetermined number of pixels or below a threshold width, length or depth excluded. In the illustrated implementation, the map analysis component provides a T2 lesion count, volume numerical results for each detected lesion, and a lesion mask image to a user at the user interface 82.

The illustrated system solves the problem of having to manually correct automated MS lesion segmentation results to remove false positives and add in false negatives. Unlike existing, semi-automated solutions, the illustrated system combines information from multiple different probability maps to achieve full automation. The approach also leverages data generated from prior studies to develop reliable maps from large cohorts of MS patients.

Figure 3:
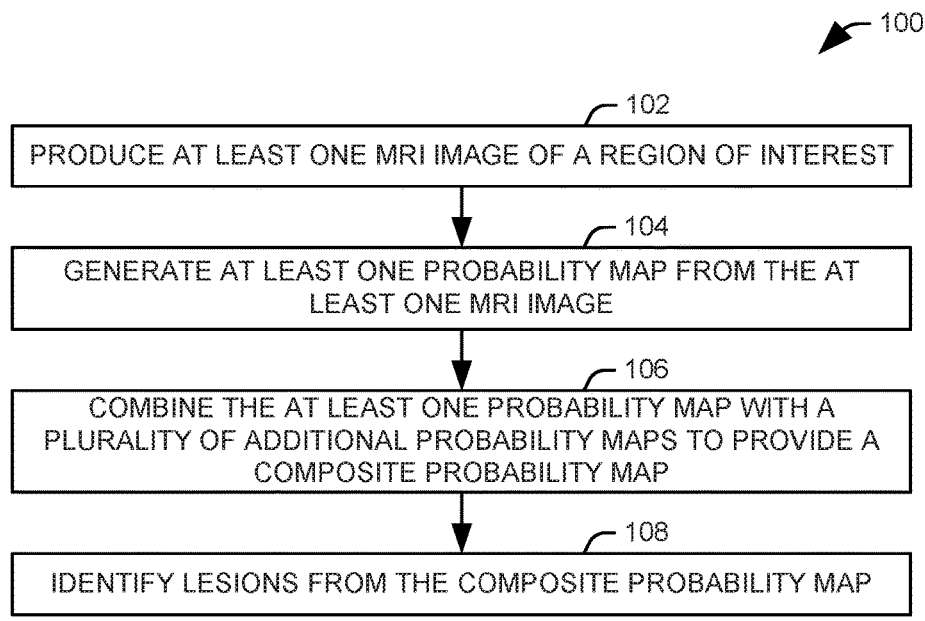
FIG. 3 illustrates an example of a method for automatic segmentation of lesions.

In view of the foregoing structural and functional features described above in FIGS. 1 and 2, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could in other examples occur in different orders and/or concurrently from that shown and described herein.

FIG. 3 illustrates an example of a method 100 for automatic segmentation of lesions. At 102, at least one MRI image is produced of a region of interest. In one implementation, the at least one MRI image includes either or both of a T2-weighted FLAIR image or a PD-/T2-weighted dual echo image. At 104, at least one probability map is generated from the at least one MRI image. In one implementation, the probability map represents a classification result for each pixel of the generated probability map. At 106, the generated probability map is combined with a plurality of other probability maps to form a composite probability map. The other probability maps can include, for example, any of a map generated from longitudinal data, a false positive probability map, or an anatomical map of an area corresponding to the region of interest. In the illustrated implementation, the composite image is a weighted linear combination of the probability maps. At 108, lesions are identified from the composite probability map, for example, as contiguous or near-contiguous regions of above-threshold probabilities that are above a certain size. The location and extent of the identified lesions can then be communicated to a user via an appropriate output device.

Figure 4:
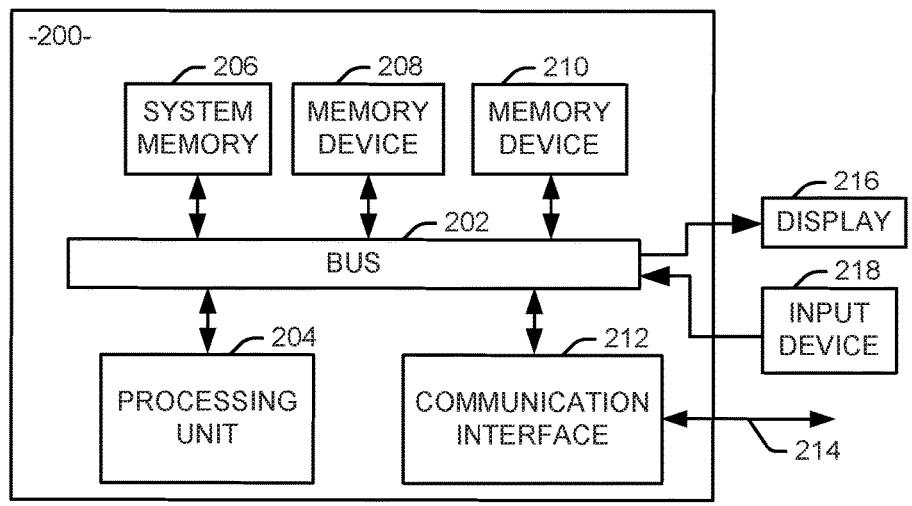
FIG. 4 is a schematic block diagram illustrating an exemplary system of hardware components capable of implementing examples of the systems and methods described herein

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a lesion segmentation system in accordance with the present invention. Computer executable logic for implementing the diagnostic system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for automated segmentation of lesions within a region of interest of a patient, comprising:
   producing at least one magnetic resonance imaging (MRI) image of the region of interest;
   generating at least one probability map from the at least one MRI image, a given probability map representing, for each pixel, a likelihood that a lesion is present at the location represented by the pixel given the at least one MRI image of the region of interest, the at least one probability map comprising a first probability map in which the likelihood for each pixel is determined via classification of intensity values of the at least one MRI image of the region of interest at the pixel;
   combining the at least one probability map with a plurality of additional probability maps to provide a composite probability map, such that each pixel of the composite probability map is a weighted linear combination of the likelihood values of the corresponding pixels in the at least one probability map and the at least one additional probability map and a set of weights for the weighted linear combination is determined using an expert system trained on prior datasets; and
   identifying lesions from the composite probability map.

2. The method of claim 1, the plurality of additional probability maps comprising a second probability map representing, for each pixel, a likelihood that a lesion is present at the location represented by the pixel given previous data sets from a population of patients, the population of patients including patients other than the patient.

3. The method of claim 2, wherein the second probability map is a generic MS (Multiple Sclerosis) lesion probability map combining of lesion maps across the population of patients to represent the regions in the brain for which it is most likely that lesions will form.

4. The method of claim 2, wherein the second probability map is a false positive probability map combining maps of false positive results across the population of patients representing regions having a high likelihood of being false positives across patients.

5. The method of claim 2, wherein the second probability map is a generic anatomic probability map of gray matter.

6. The method of claim 1, wherein the at least one probability map includes a cumulative probability map representing longitudinally acquired MRI image data for the patient, such that each of a plurality of pixels comprising the cumulative probability map is determined from a set of probability values at that location across a plurality of probability maps from previous MRI images.

7. The method of claim 1, wherein the set of weights for the weighted linear combination are different across each of a plurality of regions comprising the image, and the weights for each region are determined via a regression analysis on prior datasets.

8. A system for automated segmentation of lesions within a region of interest of a patient comprising:
   a magnetic resonance imaging (MRI) interface that receives at least one MRI image of the region of interest;
   a probability map generator that generates at least one probability map, the probability map generator comprising a pattern recognition classifier that determines, for each of a plurality of pixels, a likelihood that a lesion is present at the location represented by the pixel given intensity values of the at least one MRI image of the region of interest to provide a first probability map of the at least one probability map;
   a probability reconciliation component that combines the at least one probability map with an additional probability map to provide a composite probability map, the additional probability map representing, for each of a plurality of pixels, a likelihood that a lesion is present at the location represented by the pixel given previous data sets from a population of patients, the population of patients including patients other than the patient; and
   a map analysis component that reviews the composite probability map to indicate the location of lesions, the map analysis component selecting connected groups of high-probability pixels as lesions, and excluding groups of high-probability pixels smaller than predetermined number of pixels.

9. The system of claim 8, wherein the additional probability map is a generic MS (Multiple Sclerosis) lesion probability map combining lesion maps across a large population of patients to represent the regions in the brain for which it is most likely that lesions will form.

10. The system of claim 8, wherein the additional probability map is a false positive probability map combining maps of false positive results across the population of patients representing regions having a high likelihood of being false positives across patients.

11. The system of claim 8, wherein the additional probability map is a generic anatomic probability map of gray matter.

12. The system of claim 8, wherein the additional probability map is a first probability map of a plurality of probability maps.

13. The system of claim 8, wherein the at least one probability map includes a cumulative probability map representing longitudinally acquired MRI image data for the patient, such that each of a plurality of pixels comprising the cumulative probability map is determined from a set of probability values at that location across a plurality of probability maps from previous MRI images.

14. The system of claim 8, wherein the at least one MRI image includes at least one of a T2-weighted FLAIR image and a PD-/T2-weighted dual echo image, and the pattern recognition classifier produces a binary map representing a classification of each pixel in the region of interest from intensity values of the at least one of the T2-weighted FLAIR image and the PD-/T2-weighted dual echo image.

15. A system for automated segmentation of lesions within a region of interest of a patient comprising:
   a magnetic resonance imaging (MRI) interface that receives at least one MRI image of the region of interest;
   a probability map generator that generates at least one probability map, including a cumulative probability map representing longitudinally acquired MRI image data for the patient, such that each of a plurality of pixels comprising the cumulative probability map is determined from a set of probability values at that location across a plurality of probability maps from previous MRI images, and the probability map generator comprising a pattern recognition classifier that determines, for each pixel, a likelihood that a lesion is present at the location represented by the pixel given intensity values of the at least one MRI image of the region of interest to provide a first probability map of the at least one probability map; and a probability reconciliation component that combines the at least one probability map, the cumulative probability map, and a generic MS (Multiple Sclerosis) lesion probability map combining lesion maps across a large population of patients to represent the regions in the brain for which it is most likely that lesions will form and a false positive probability map combining maps of false positive results across the population of patients representing regions having a high likelihood of being false positives across patients to provide a composite probability map.

16. The system of claim 15, wherein the probability reconciliation component combines the binary map, the cumulative probability map, the generic MS lesion probability map, the false positive probability map, and a generic anatomic probability map of gray matter to provide the composite image.

* * * * *